United States Patent [19]

Greenfield et al.

[11] 4,145,079

[45] Mar. 20, 1979

[54] RAILROAD CAR WHEEL

[75] Inventors: Lawrence P. Greenfield, Evanston; George E. Novak, Riverside; Daniel H. Stone, Evanston, all of Ill.

[73] Assignee: Trailer Train Company, Chicago, Ill.

[21] Appl. No.: 798,897

[22] Filed: May 20, 1977

[51] Int. Cl.² .............................. B60B 3/02; B60B 17/00; B60B 21/04; B60B 23/00

[52] U.S. Cl. .................................. 295/21; 295/27; 295/29; 295/31 R

[58] Field of Search .................... 295/21, 22, 23, 24, 295/27, 28, 29, 30, 31; 116/114 R

[56] References Cited

U.S. PATENT DOCUMENTS

| | | | |
|---|---|---|---|
| 1,470 | 1/1840 | Bergstresser | 295/27 |
| 830,363 | 9/1906 | Pilcher et al. | 295/27 |
| 904,162 | 11/1908 | Vial | 295/27 |
| 1,377,617 | 5/1921 | Dieter | 295/29 |
| 1,908,740 | 5/1933 | Fahrenwald | 295/30 |
| 2,768,020 | 10/1956 | Sylvester | 295/27 |
| 3,038,755 | 6/1962 | Keysor | 295/21 |
| 3,308,755 | 3/1967 | Eda et al. | 116/114 R X |
| 3,311,403 | 3/1967 | Beetle et al. | 295/27 |

OTHER PUBLICATIONS

Novak, et al., A Three Dimensional Finite Difference Solution for the Thermal Stresses in Railcar Wheels, Journal of Engineering for Industry, Transactions of the ASME, vol. 91, Series B, Aug. 1969, pp. 891-896, Paper No. 69-RR-4.

Novak, et al., Asymmetrical Wheel Stresses Caused by Simulated Thermal and Mechanical Service Loads, an ASME Publication, 7Z-WA/RT-13, Nov. 1972, pp. 1-13.

Novak, et al., The Effect of Rim Thickness on Wheel Stresses Caused by Simulated Service Conditions, an ASME Publication, 73-WA/RT-10, Nov. 1973, pp. 1-8.

Novak, et al., The Effects of Wheel Designs and Service on the State of Stress in 28 Inch (0.712m) Diameter Freight Car Wheels, The Fifth Wheelset Congress in Tokyo, Japan, Oct. 1975, vol. I, pp. 16.1-16.13.

Novak, et al., Simulated Operating Stresses in 28-In.-Dia. Wheels, an ASME Publication, 75-RT-10, Apr. 1978, pp. 1-8.

Primary Examiner—Frank E. Werner
Assistant Examiner—Howard Beltran
Attorney, Agent, or Firm—Robert V. Jambor

[57] ABSTRACT

A railroad car wheel having an annular hub for connection to an axle and defining an inner radial surface adapted for disposition in facing relating to the inner surface of a wheel on the opposite end of the axle and an outboard radial surface facing outwardly of the wheel, an annular tread defining rim portion disposed generally concentrically of the hub and defining an inner radial surface adapted for disposition in facing relation to the inner surface of a wheel on the opposite end of the axle and an outboard radial surface facing outwardly of the wheel, the rim portion being displaced axially outwardly with respect to the hub and including an outer, generally cylindrical rail engaging surface provided with radially extending flange adjacent the inner radial surface, and an integral annular plate portion connecting the rim and hub, the plate having a relatively thin cross section and being generally frusto-conical defining inboard and outboard conical surfaces, the plate joining the hub adjacent the inner radial surface with the inboard conical surface of the plate merging into the inner radial surface of the hub, the plate joining the rim with at least one of the inboard and outboard conical surfaces merging respectively with one of the inner radial outboard radial surfaces of the rim.

10 Claims, 8 Drawing Figures

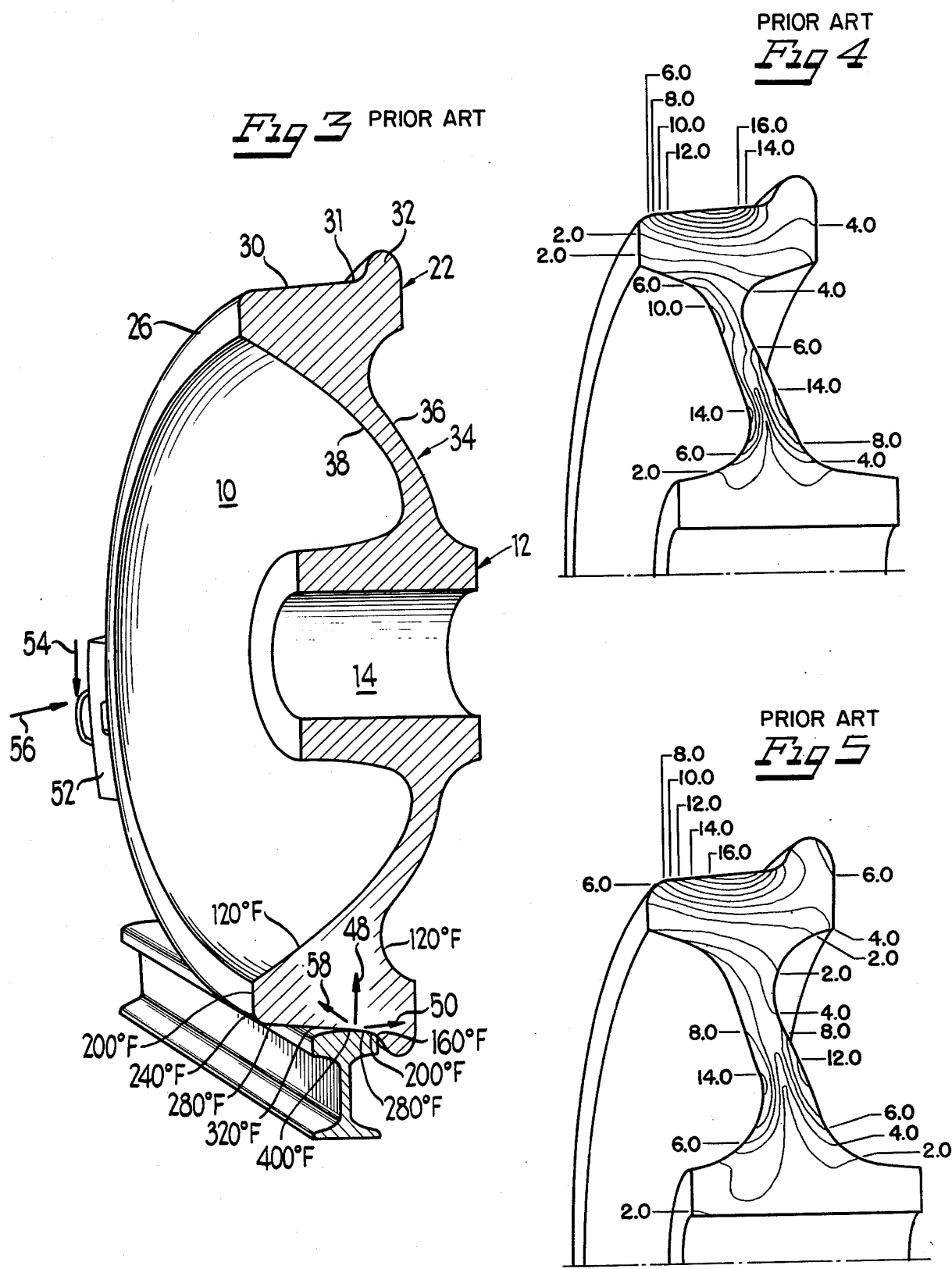

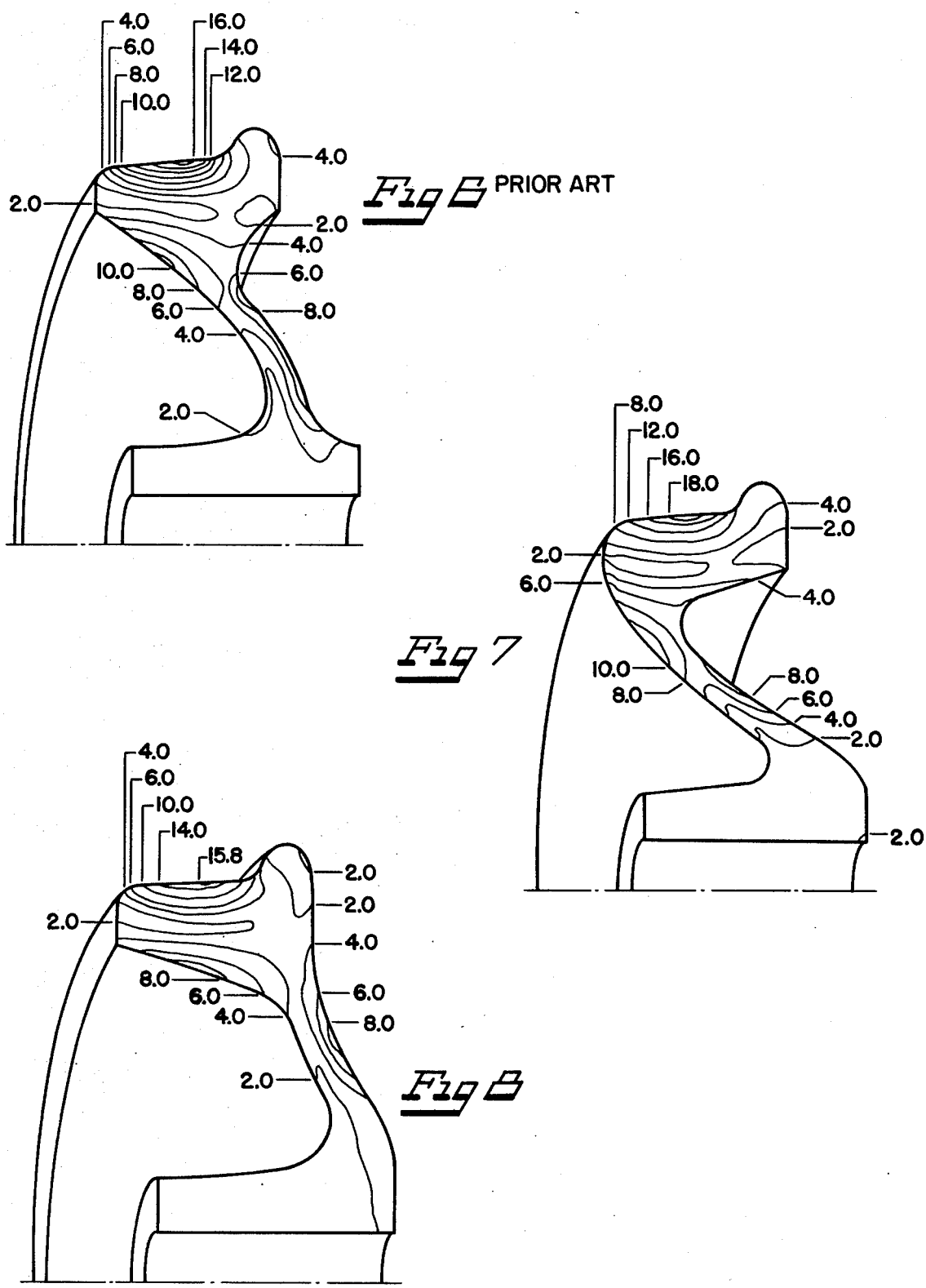

RAILROAD CAR WHEEL

BACKGROUND OF THE INVENTION

1. Field of Invention

The invention relates generally to a railroad car wheel of unitary structure. More particularly, it relates to a wheel which is especially resistant to fracture in the regions of connection between the wheel plate and the hub and rim when subjected to the stresses of common usage.

2. Description of the Prior Art

It has long been recognized that steel railroad wheels suffer cracks and fissures during use. Heat produced in the tread due to braking and the stresses of expansion and contraction due to heat generated by friction brakes are major contributing causes. Most prevalent of plate failures are cracks occurring in the transitional regions interconnecting the rim and hub which are relatively long in axial extent to the relatively thin sectioned plate. These areas of necessity define substantial changes in cross sectional area, a typical location for stress concentration.

Efforts to minimize the effect of mechanical and thermal stress have included increasing the surface area for better heat dissipation, increasing the metal volume for added strength, and modifying the configuration of the plate which connects the hub and rim. This latter approach has included use of large or specially shaped radii in the area of transition between the plate and the hub and rim or alteration of the angle of the plate with respect to the vertical plane of rotation of the wheel. Examples of such approaches are found in prior U.S. patents including U.S. Nos. 2,768,020; 3,038,755 and 3,311,403.

For example in U.S. Pat. No. 2,768,020 there is shown a wheel having a flat plate which is not parallel to the plane of rotation of the wheel. It is frusto-conical, diverging outwardly from hub to rim. The plate is connected to the rim and hub by fillets having gentle, gradual curves.

In U.S. Pat. No. 3,038,755 there is shown a plate which is curved in the radial plane with parabolic fillets at the plate rim junction and the plate hub junction to resist the stresses of heat expansion on braking.

In U.S. Pat. No. 3,311,403 the acute angle between the plate and the axle is reduced, thus giving the frusto-conical shape greater slant from the vertical plane. This modification is intended to minimize stresses during braking.

There are several common forms of railroad car wheels currently in use. Flat cars typically used to haul semi-trailers and automobiles often use a 28-inch wheel with either a "straight" plate or a "curved" plate connecting the hub and rim. One straight plate wheel is designated the B-28 and D-28. There exists two curved plate designs, the CB-28 and the CD-28. They are the same except for rim thickness.

The rim in each of these designs is displaced axially outwardly such that the rail flange overlies the hub near its center. The plate or web connecting the rim and hub defines a frusto-conical annulus which is concave as viewed from the outboard sides of the wheel.

The plate connects to the hub and rim intermediate the inboard and outboard radial end surfaces. Inboard and outboard concave curved surfaces or fillets at each connection define the transition between the hub and rim. These curved surfaces provide a smoothly progressing transitional area and are intended to minimize stress concentration in these areas.

Wrought steel straight plate wheels of B-28 configuration have been prone to crack in the rear (inboard) rim-to-plate fillet and in the front (outboard) hub-to-plate fillet. As a result, a more recent design straight plate wheel designated D-28 has incorporated a plate having a greater cross-section in the area of the hub-to-plate connection and the curved transitional surfaces define parabolic curves with the major axis disposed generally in the radial direction. Also the plate is slanted from the radial plane to a greater degree than the plate of the B-28 wheel. These features are intended to reduce the level of stress in the critical transition zones.

The present invention evolved as a result of a mathematical analysis of the various wheel designs described above. Through the use of finite-element and finite-difference computer-aided mathematical techniques the stress patterns of various wheel designs were determined. The particular analytical methods utilized have previously been published in the following technical papers:

a. Novak, G. E., and Eck, B. J., "A Three Dimensional Finite Difference Solution for the Termal Stresses in Rail Car Wheels", *Journal of Engineering for Industry, Transactions of the ASME,* Vol. 91, Series B, August, 1969, pp. 891–896.
  b. Novak, G. E., and Eck, B. J., "Asymetrical Wheel Stresses caused by Simulated Thermal and Mechanical Service Loads", ASME Paper 72-WA/RT-13, November 1972.
  c. Novak, G. E., Kucera, W. J., and Eck, B. J., "The Effect of Rim Thickness on Wheel Stresses Caused by Simulated Service Conditions", ASME Paper 73-WA/RT-10, November 1973.

The investigation considered simulated vertical and lateral mechanical loads in combination with thermal loads from braking, as well as other loads induced by the mechanical braking load. Vertical wheel loading and vertical and lateral wheel loading during non-braking operations were also considered. The states of stress in the B-28, D-28 and CB-28 were developed. The results of these analytical investigations have been published before the Fifth International Wheel Set Congress, held October 1975. A paper entitled "The Effects of Wheel Design and Service Environment on the State of Stress in 28 Inch Diameter Freight Car Wheels" was presented by the inventors.

Utilizing the results of the above investigation and considering the manner of wheel response to external loading wheel shapes were modified to minimize stress levels in the critical areas of rim-to-plate and hub-to-plate transition. These modifications concentrated upon change in configuration rather than any change in mass of the wheel in order to avoid any attendant change in other operating characteristics.

Utilizing the same mathematical techniques new program capabilities were added to determine the effects of the simultaneous application of mechanical and thermal loading. The modified wheel configurations were evaluated in terms of stress due to such combined loading. The results established that the new configuration improved the stress levels experienced confirming the advantage of the new design.

SUMMARY OF THE INVENTION

The improved form of railroad wheel of the present invention achieves its advantages through placement of the respective component of hub, rim and plate in a configuration which minimizes the need for use of transitional fillets or radii. The plate is arranged to join the hub adjacent the inboard edge and the inboard conical surface of the plate merges into the inner radial surface of the hub. The juncture between rim and plate is arranged such that at least one of the inboard and outboard conical surfaces of the plate respectively merge directly into a radial inboard or radial outboard surface of the rim.

In one embodiment the plate joins the rim adjacent the radial outboard surface with the conical outboard surface of the plate merging directly into the outer radial edge of the rim. The rim is in essence cantilevered to the plate adjacent the outboard edge.

In another embodiment the major support of the rim upon the plate is adjacent the inner radial edge of the rim, again providing in essence a cantilevered support. The inboard conical surface of the plate merges directly into the inner radial surface of the rim.

As can be appreciated with the above configurations, the cantilevered attachment of the rim to the plate provides for distortion during load application to the rim, such as in braking.

The physical movement within the wheel itself if considered to provide counteradditive rather than additive stresses to those present due to vertical and lateral loading. This reduces the overall stress to provide substantial improvements over straight plate designs and to achieve operating stresses well within acceptable limits.

In addition the direct merger of at least one of the surfaces defined by the plate into at least one radial edge of each of the hub and rim minimizes the usage of traditional concave transitional fillets providing improved resistance to stress concentration in critical areas.

DESCRIPTION OF THE DRAWINGS

FIG. 3 is a perspective view of a railroad wheel illustrating the various external forces taken into consideration in connection with the mathematical analysis utilized in evaluating the advantages of the railroad wheels of the present invention as compared to prior designs.

FIG. 4, 5 and 6 are fragmentary cut-away perspective views respectively of the B-28, D-28 and CB-28 railroad car wheels of the prior art illustrating internal stresses experienced during braking.

FIGS. 7 and 8 are fragmentary cut-away perspective views respectively of the railroad wheels shown in FIGS. 1 and 2 illustrating the conditions of internal stress experienced during braking.

DETAILED DESCRIPTION

Figure 1:
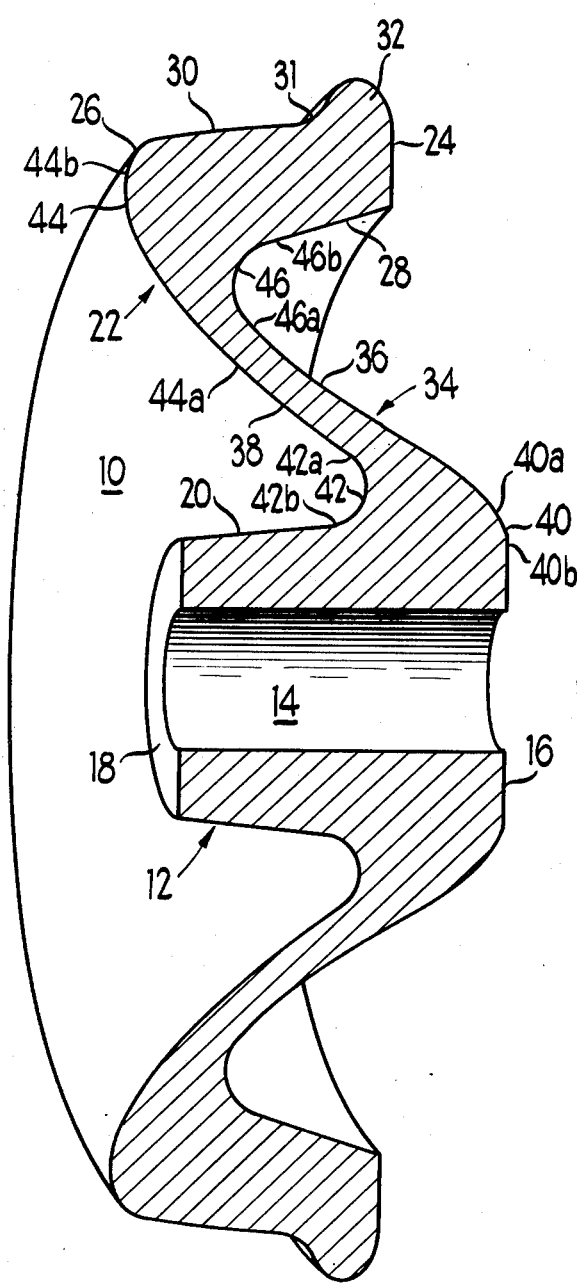
FIG. 1 is a cut-away perspective view of a railroad wheel of the present invention.

Referring now to the drawings, there is illustrated in FIG. 1 a railroad wheel embodying the function of the present invention. The wheel is an integrally formed structure, for example, cast steel. However, portions of the wheel are described separately and designated by distinct terminology for simplicity of description.

The wheel 10 includes a central hub 12 defining a bore 14 adapted to receive an axle (not shown). The hub is relatively axially elongated and includes an inner radially directed annular surface 16 adapted to face inboard, that is, toward the wheel mounted on the opposite end of the axle and an outer radially directed annular surface 18. It further defines an outer cylindrical surface 20.

The wheel illustrated in FIG. 1 further includes a generally annular rim portion 22 which is also relatively axially elongated and concentrically disposed with respect to the hub 12. The rim includes a radially directed inboard or inner annular surface 24 and an outboard surface 26.

The rim includes conical surface 28 and an outer rail contacting tread surface 30. A radial flange 32 extends radially outwardly of the tread surface adjacent the inner radially directed annular surface 24. During use, the flange 32 is adapted to contact the inboard edge of the rail to maintain the wheel and rail in operative association. The transitional area 31 between the tread surface 30 and the flange 32 is referred to as the flange throat.

The rim portion 22 is displaced axially with respect to the hub in the outboard direction. The flange 32 therefore overlies the hub 12 intermediate its radially directed inner and outer surfaces 16 and 18. This is a conventional relationship between the hub and rim common to modern railroad wheels.

A plate 34 in the form of a thin sectioned generally frusto-conical web is integrally connected to the hub 12 and the rim 22. It is relatively thin in axial extent as compared to the hub and rim and defines an inboard surface 36 and an outboard surface 38.

In accordance with the principles of the present invention the plate 34 joins the hub 12 adjacent the inner radial surface 16. The inboard surface 36 merges directly with the radial surface 16 and defines a convex transition surface 40 tangent to surfaces 36 and 16 at 40a and 40b.

The outboard surface 38 of the plate merges into the generally cylindrical outer surface 20 of the hub. A concave fillet 42 is provided which is tangent to surfaces 38 and 20 at 42a and 42b.

The outboard surface 38 of the plate 34 merges directly into the outer radial surface 26 defining a long convex transition surface 44 tangent to both the surface 26 and the surface 38 at points 44a and 44b.

The inboard surface 36 of the plate 34 merges with conical surface 28. A concave transitional fillet 46 is provided which is tangent to its connecting surfaces at 46a and 46b.

In this embodiment each transitional area connecting the plate with the hub or rim includes only one concave transitional surface. The connection of the plate 34 to the hub 12 is offset axially in the inboard direction to the maximum and the inboard surface 36 of the plate merges directly into the inboard radial surface 16 of the hub. Similarly the connection of the plate 34 to the rim 22 is offset axially in the outboard direction to the maximum and the outer surface 38 of the plate merges directly into the radial surface 26 of the rim. The rim is thereby supported in cantilevered fashion by the plate, that is, at one of its radial edges.

Figure 2:
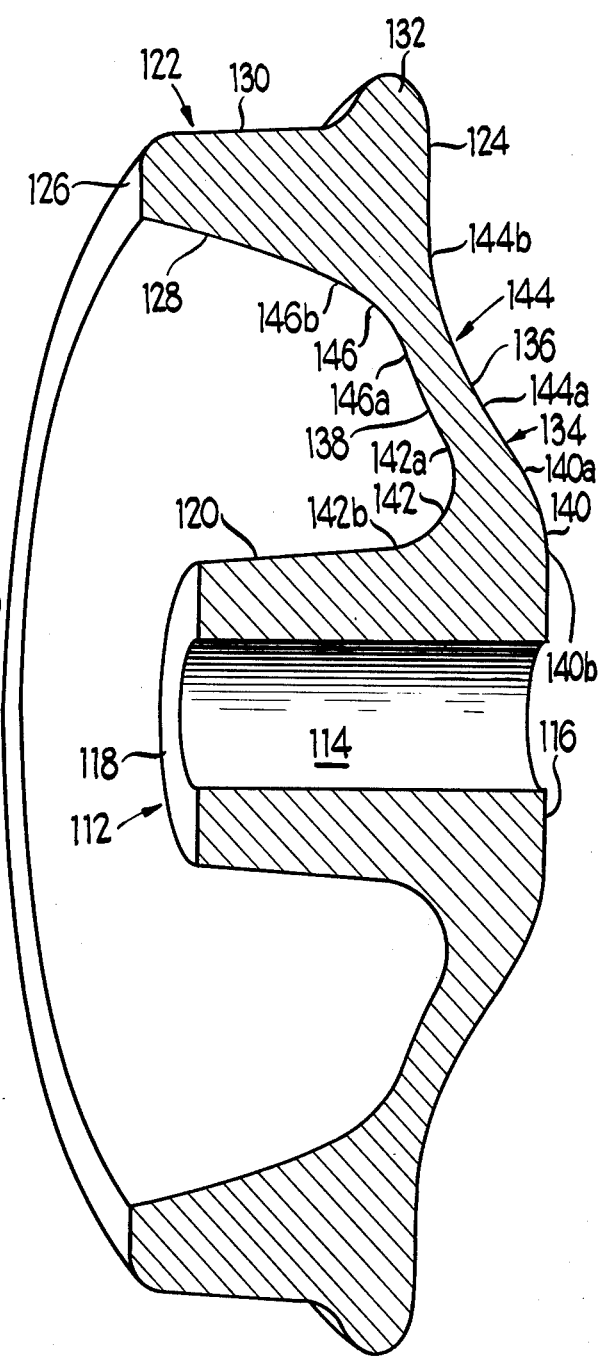
FIG. 2 is a cut-away perspective view of a railroad wheel illustrative of a modified form of the invention.

Turning now to FIG. 2 there is illustrated a modified form of railroad wheel embodying the principles of the present invention.

The wheel 110 includes a hub 112 defining a bore 114. It includes an inner radially directed annular surface 116 and an outer radially directed annular surface 118 and an axially elongated generally cylindrical outer surface 120.

The wheel 110 includes a rim portion 122 which has an inner radially directed annular surface 124 and an outer radially directed annular surface 126.

The rim 122 includes a conical surface 128 and a tread surface 130. A radial flange 132 extends radially outwardly of the tread surface 130 adjacent the inner annular radially directed surface 124.

As in the prior embodiment the rim 122 is displaced axially outwardly with respect to the hub 112 such that the flange 132 overlies the hub intermediate its radial inner and outer surfaces 116 and 118.

A thin sectioned plate 134 integrally connects the hub and rim. It is in the form of a transition frusto-conical annulus which diverges in the outboard direction from hub to rim. It includes inboard conical surface 136 and outboard conical surface 138.

The plate 134 joins the hub 112 adjacent the inner radially directed annular surface 116 and, hence, is displaced inboard the maximum amount. The inboard surface 136 merges directly into the radially directed annular surface 116 to define a convex transition surface 140 tangent to the plate and hub respectively at 140a and 140b. The outer conical surface 138 merges with the hub 112 at cylindrical surface 120. A concave fillet 142 is provided which is tangent to the plate surface 138 at 142a and tangent to the cylindrical surface 120 of the hub at 142b. The plate 134 joins the rim 122 adjacent the inner radially directed annular surface 124. It is displaced in the inboard direction to the maximum and provides cantilevered support of the rim 122 upon the hub 112.

The inner conical surface 134 merges directly into the convex radially directed surface 124 of the rim. A transition surface 144 is tangent to the plate surface 134 at 144a and tangent to the radial surface 124 of the rim at 144b. Due to the axial offset of the rim 122 with respect to the hub 112 and the maximum inboard position of the plate 134, the transition surface 144 is just slightly concave.

The outer plate surface 138 joins the conical surface 128 of the rim through concave fillet 146 which is tangent to surface 138 at 146a and tangent to surface 128 at 146b.

In this later embodiment there is provided direct merger of the plate into the radial inboard surface of the hub, thus providing maximum inboard shift of the plate. There is also direct merger of the inner conical surface 136 of the plate with the inner radially directed surface 124 of the rim. As in the previous embodiment, the rim is supported in cantilevered fashion at one of its radial edges.

FIG. 3 is illustrative of the frame of reference of the mathematical analysis utilized in evaluating the conditions of octahedral shear stress in prior wheel designs and for comparative evaluation of the embodiments of the present invention. These analyses utilizing finite-element and finite-difference computer aided mathematical methods provided stress maps showing the conditions of stress within a wheel while under simulated loads. These maps were plotted along an axial plane through the wheel and show the stress conditions of the wheel cross section between the axle and rail. FIGS. 4 through 8 show these plots for various wheel configurations including, in FIGS. 7 and 8 wheels embodying the principles of the present invention.

The analyses were of various 28-inch wheel designs. The assumed loads are shown by the arrows in FIG. 3. These were a vertical load (arrow 48) of 46,100 pounds and a lateral wheel load (arrow 50) of 20,000 pounds.

In addition the effects of thermal and mechanical loads produced by an emergency brake application were taken into consideration. When a brake shoe such as the shoe 52 in FIG. 3 contacts the tread surface 30 of a wheel both radial and tangential loads result (arrows 54 and 56). The tangential force produces a corresponding tractive load on the wheel surface at the wheel-rail interface (58) creating the desired deceleration of the rail car (arrow 58).

In the analysis of wheel designs a brake shoe normal force (56) of 6200 pounds was selected and a resultant tractive load (arrow 58) and tangential shoe force (54) at the wheel tread was assumed to be 720 pounds. These loads are consistant with those developed by cast iron shoes with a 90 pounds per square inch (PSI) brake cylinder pressure, commonly used for an emergency brake application.

The resultant temperature fields shown mathematically to be produced under the above described load conditions were applied in each instance. The particular thermal load applied corresponded to the temperature distribution in a wheel after 55 seconds of brake application, when tread surface temperatures were at a maximum. The surface temperatures assumed in each case are illustrated in FIG. 3. A maximum temperature of 400° F. was found to exist at the wheel tread surface 30. This diminished in the radial direction to 120° F. in the transition between the plate 34 and rim 22.

Loads due to angular velocity of the wheel at the same time period as that assumed with respect to temperature were also considered in the analysis. These assumed that at the beginning of the application of braking force the wheel was rotating at 841 r.p.m. and that after 55 seconds of brake application the maximum temperature was reached.

Turning now to FIGS. 4 through 8 there are illustrated stress map plots for various wheel designs including those of the present invention. The embodying octahedral shear stress is expressed in kilopounds (kips) per square inch (KSI).

FIG. 4 is a stress map for a straight plate wheel (B-28). It reveals that the internal stresses are high in the critical areas of transition between the plate 34 and the rim 22 and hub 12.

FIG. 5 is a plot of stress conditions in the more recently developed straight plate wheel, the D-28. Again the stress levels are most significant in the transitional areas between plate and hub and rim.

FIG. 6 is a plot of the stress conditions in a curved plate wheel the CB-28. The advantages of the curved plate are apparent stress in the critical transition areas are reduced.

FIGS. 7 and 8 illustrate the results of the analyses of wheel configurations illustrated in FIGS. 1 and 2 respectively, each of which embody the principles of the present invention.

Referring to FIG. 7, the wheel shown in FIG. 1 develops a significantly lower level of stress in the critical transitional areas between the plate and hub and rim then either the B-28 or D-28 wheels (FIGS. 4 and 5). Significantly the highest levels of stress have been moved into the plate away from the two critical locations thereby improving the stress distribution. The state of stress is improved over that present in the curved plate wheel (FIG. 6). The wheel of FIG. 1 exhibits a redistributed stress pattern with maximum stress moved into the plate and away from the critical area of the inboard transition between rim and plate.

Referring to FIG. 8, the wheel of FIG. 2 also shows significant reduction in stress intensity than either of the straight plate configurations (FIGS. 4 and 5) or the curved plate wheel (FIG. 6). Similar to the embodiment of FIG. 1 this embodiment shows highest stress levels in non-critical locations.

It has been determined that in straight plate wheels the stress due to mechanical loading and the stress due to thermal differentials distort the wheel in an additive manner. This is not the case in a curved plate wheel such as shown in FIG. 6. There the distortion due to mechanical loading is considered to cause distortion in a direction opposite to that caused by thermal loading thus providing the advantage of overall reduction in the maximum stress levels. The present invention achieves this advantage through orientation of the plate-to-hub connection adjacent the inboard edge of the hub. This inboard offset produces the maximum counter-additive relationship between mechanical and thermal loading.

The rim-to-plate connection is also offset to provide cantilevered support of the rim upon the plate by forming the connection between plate and rim adjacent the outboard or inboard edge (FIGS. 1 and 2 respectively).

Additionally, in each embodiment the plate merges directly into the inboard radial edge of the hub eliminating the need for a concave transitional fillet. The connection between the rim and plate in each embodiment is similarly arranged to eliminate at least one concave transitional fillet. In the embodiment of FIG. 1 the outboard conical surface 38 of the plate 34 merges directly into the outer edge 46 of the rim. In the embodiment of FIG. 2 the inner conical surface 136 of the plate 134 merges directly into the inner radial surface 124 of the rim.

The wheels of the present invention provide for significant reduction in overall stress intensity. In addition maximum stress levels are shifted from critical transitional areas between the plate and hub and rim. Prolonged life and/or the ability to carry great loads is the expectant result.

Various features of the present invention have been shown and described in connection with the illustrated embodiments. However, it must be understood that various modifications may be made without departing from the scope of the invention.

What is claimed is:

1. A railroad car wheel having an axially elongated annular hub for connection to an axle defining an inner radial surface adapted for disposition in facing relating to the inner surface of a coacting wheel on the opposite end of the axle and an outboard surface facing outwardly of said wheel; an axially elongated annular tread defining rim portion disposed generally concentrically of the hub and defining an inner radial surface and an outboard surface spaced therefrom, said rim being displaced axially outwardly with respect to said hub and having a rail engaging surface provided with a radially extending flange adjacent said inner radial surface, and an integral relatively thin sectioned plate portion connecting said hub and said rim, said plate being generally frusto-conical and defining an inboard conical surface and an outboard conical surface, said plate joining said hub adjacent said inner radial surface thereof with said inner conical surface of said plate merging directly into said inner radial surface.

2. A railroad car wheel as claimed in claim 1 wherein said plate joins said rim adjacent one of said inner radial surface and said outboard surface.

3. A railroad car wheel as claimed in claim 2 wherein said plate joins said rim adjacent said outboard surface thereof with said outboard conical surface merging directly with said outboard surface of said rim.

4. A railroad car wheel as claimed in claim 2 wherein said plate joins said rim adjacent said inner radial surface thereof with said inboard conical surface merging directly with said radial inner surface of said rim.

5. A railroad car wheel as claimed in claim 2 wherein said rim is connected to said plate adjacent one of the radial inboard and outboard edges to provide cantilevered support of said rim on said plate.

6. A railroad car wheel as claimed in claim 1 wherein the transition between said plate and said hub includes a convex transition surface tangent to said radial inner surface of said hub and tangent to said inboard conical surface of said plate.

7. A railroad car wheel as claimed in claim 6 wherein said hub includes a generally cylindrical surface and said transition between said plate and said hub includes a concave transition surface tangent to said outboard conical surface of said plate and said cylindrical surface of said hub.

8. A railroad car wheel as claimed in claim 6 wherein said plate joins said rim adjacent the outboard surface thereof and the transition therebetween includes a convex transition surface tangent to said outboard conical surface of said plate and said outboard surface of said rim.

9. A railroad car wheel as claimed in claim 6 wherein said plate joins said rim adjacent said radial inner surface thereof and the transition therebetween includes a transition surface tangent to said inboard conical surface of said plate and said radial inner surface of said rim.

10. A railroad car wheel as claimed in claim 1 wherein said plate juncture with said rim is displaced axially to the maximum in the inboard direction.

* * * * *